United States Patent
Portman et al.

(10) Patent No.: US 8,320,536 B2
(45) Date of Patent: Nov. 27, 2012

(54) METHOD AND SYSTEM FOR CENTRALIZED RECORDING IN A DISTRIBUTED ENVIRONMENT

(75) Inventors: Leon Portman, Rishon Lezion (IL); Stas Margolis, Alfei Menashe (IL); Noam Ben Zeev, Tel Aviv (IL); Shay Weiss, Ra'anana (IL); Dan Hadari, Hod Hasharon (IL); Yuval Sittin, Zor Moshe (IL)

(73) Assignee: Nice Systems Ltd., Raanana (IL)

( * ) Notice: Subject to any disclaimer, the term of this patent is extended or adjusted under 35 U.S.C. 154(b) by 1107 days.

(21) Appl. No.: 12/111,215

(22) Filed: Apr. 29, 2008

(65) Prior Publication Data

US 2009/0268885 A1 Oct. 29, 2009

(51) Int. Cl.
*H04M 1/64* (2006.01)

(52) U.S. Cl. ............... 379/88.17; 379/88.13; 379/88.22; 379/265.07; 379/265.09; 370/241; 370/353

(58) Field of Classification Search ............... 379/88.13, 379/265.07, 265.06, 265.09, 88.22; 370/241, 370/352

See application file for complete search history.

(56) References Cited

U.S. PATENT DOCUMENTS

| | | | |
|---|---|---|---|
| 6,246,752 B1 * | 6/2001 | Bscheider et al. | 379/88.22 |
| 6,751,297 B2 * | 6/2004 | Nelkenbaum | 379/88.13 |
| 2005/0286708 A1 * | 12/2005 | Slosberg et al. | 379/265.07 |
| 2008/0298253 A1 * | 12/2008 | Walker et al. | 370/241 |
| 2009/0116476 A1 * | 5/2009 | Halbraich et al. | 370/352 |
| 2009/0185673 A1 * | 7/2009 | Erhart et al. | 379/265.09 |

* cited by examiner

*Primary Examiner* — Fan Tsang
*Assistant Examiner* — Van D Huynh
(74) *Attorney, Agent, or Firm* — Pearl Cohen Zedek Latzer, LLP

(57) ABSTRACT

A system and method for central recording of telephone calls are provided. The method may include transferring a telephone call from a session border controller (SBC) to a contact center and to a central recording unit, transferring of CTI information from the contact center to the central recording unit, associating the CTI information to the telephone call and determining by the central recording unit whether to record the call.

10 Claims, 3 Drawing Sheets

METHOD AND SYSTEM FOR CENTRALIZED RECORDING IN A DISTRIBUTED ENVIRONMENT

BACKGROUND

Capturing and recording multimedia data is a frequent and well known practice within commercial environments. For example, many industries, organizations and companies use call centers or contact centers for customer service and at least a portion of communication session handled by the contact centers are recorded.

A typical customer-service telecommunications system may include, at least one data center capable of controlling a plurality of contact centers. The telephony links between the data center and the call center may be over an Internet Protocol (IP) network, while the telephony within the contact center bay be either IP-based or TDM-based (time division multiplexing). Recording of telecommunication sessions, e.g., telephone calls as voice over IP (VoIP) sessions may be performed independently at each contact center. Such a solution requires installing separate recording equipment at each contact center and involves complex recording management. The need for a centralized recording architecture solution is highly required.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
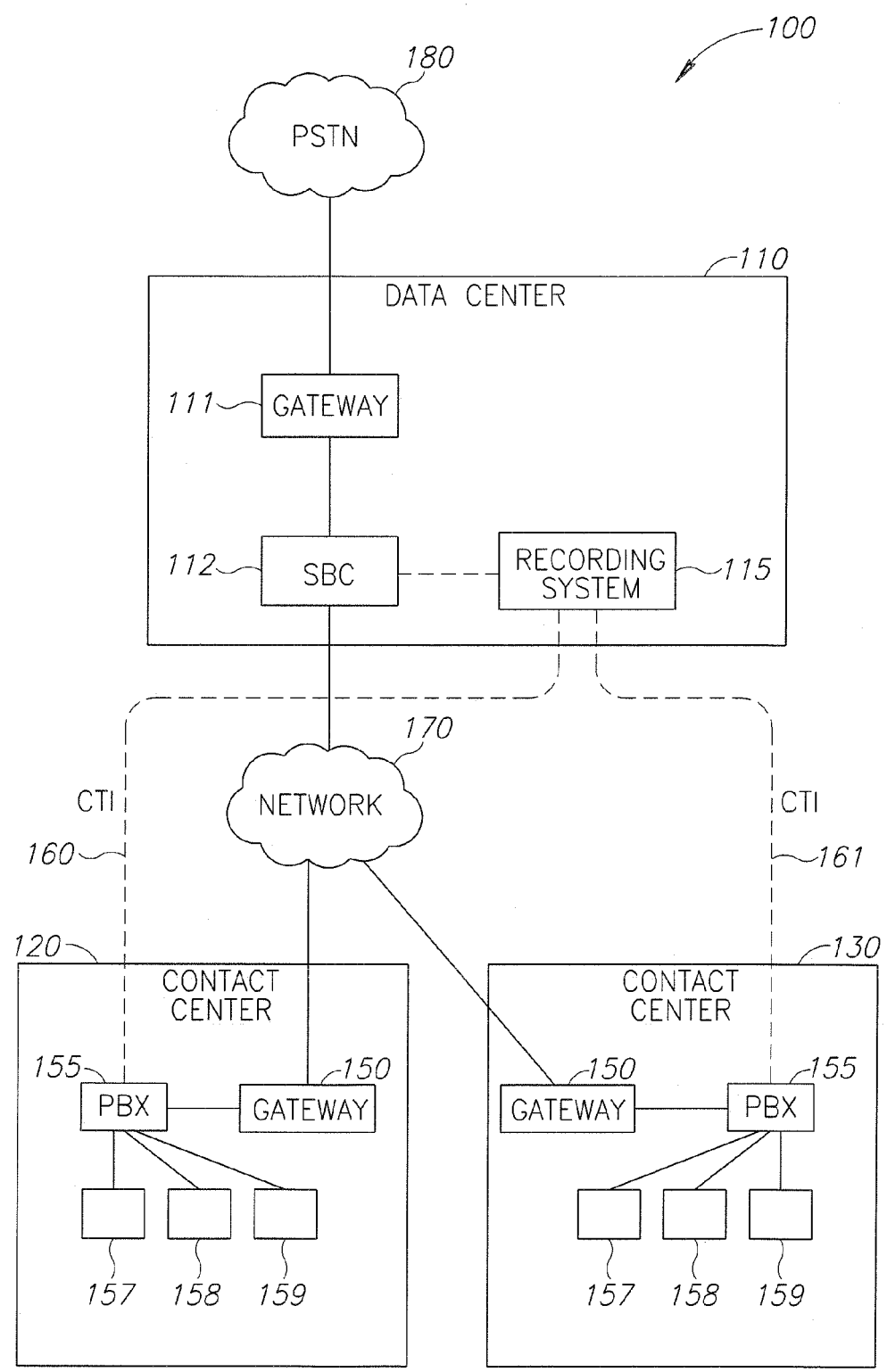
FIG. 1 is a high-level block diagram of an exemplary centralized recording system according to embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF DEMONSTRATIVE EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the terms "contact center" and "call center" as used herein may be used throughout the specification and claims to describe any centralized or distributed locations used for collective handling of multi-media information, for example, telephone calls, faxes, e-mails and the like, or any other centralized or distributed locations used for the purpose of receiving, transmitting and controlling a large volume of information.

Although embodiments of the invention are not limited in this regard, the term "data center" as used herein may be used throughout the specification and claims to describe any centralized location or facility capable of handling and controlling telecommunication traffic related to more than one contact center.

Although embodiments of the invention are not limited in this regard, the term "service provider site", "provider center" and "provider site", as used herein may be used throughout the specification and claims to describe any centralized location, facility, business or organization such as telephone or Internet companies that provides communication services such as internet access including VoIP telephony via various technologies and related services. For example, IP telephony service providers, customer support contact centers, self services, third generation contact centers, web-based services and the like.

Although embodiments of the invention are not limited in this regard, the terms "call", "session" or "interaction" as used herein may be used throughout the specification and claims, to describe a communication session between two or more parties such as, a telephone call, VoIP telephone call, an instant messaging session, chat, video conference or any other multi-media session or interaction in a multi-media communication environment.

Although embodiments of the invention are not limited in this regard, the terms "Session Border Controller (SBC)" as used herein may be used throughout the specification and claims to describe a device used in communication networks such as Voice over Internet Protocol (VoIP) networks to control signaling and media streams involved in setting up, conducting, and tearing down calls or sessions as they traverse borders between one part of a communication network and another.

Embodiments of the invention may enable centralized recording in a multiple site communication environment by forwarding communication sessions from a SBC to a recording system located in a central location external to the call handling sites (contact centers), as described in detail below.

Reference is now made to FIG. 1, which is a high-level block diagram of an exemplary centralized recording system according to embodiments of the present invention. Telecommunication environment 100 may include one or more locations to handle communication sessions, for example, a data center 110 and contact centers 120 and 130. Contact centers 120 and 130 may receive calls from data center 110 via a communication network, such as packet switched network, for example, an Internet network 170. The calls may be delivered to data center 110 via a public communications network, for example a public switched telephone network (PSTN) 180.

Although in the exemplary illustration of FIG. 1, one data center and two contact centers are shown it should be understood to a person skilled in art that the invention is not limited in this respect and according to embodiments of the present invention, telecommunication environment 100 may include any suitable number of data centers and any suitable number of contact centers or other type of branches, sites or locations associated with each data center.

According to some embodiments of the invention, data center 110 may include communication equipment such as gateway 111 and SBC 112. Gateway 111 may translate communication sessions, for example, from TDM (Time-Division Multiplexing) to IP telephony and may transfer, route and switch the telecommunication transport or sessions to/from the outside world over, for example, PSTN 180. Incoming telecommunication transport or sessions may be transferred from gateway 111 via SBC 112 to contact centers 120 and 130 over, for example, Internet network 170 as described in detail below. Outgoing telecommunication transport or sessions may be transferred from contact centers 120 and 130 to SBC 112 over, for example, Internet network 170, and from SBC 112 via gateway 111 over, for example, PSTN 180 to the outside world.

Data center 110 may further include or may be coupled to a central recording system 115, or alternatively to a plurality of recorders 115 to receive communication sessions from SBC 112 and to record the communication sessions as described with reference to embodiments of the present invention. Data center 110 may include other servers or central network components.

Contact centers 120 and 130 may each include a gateway 150, a telephone switch such as a Private Branch exchange (PBX) 155, and one or more agent stations 157, 158 and 159. Each agent station may include suitable equipment to handle communication sessions such as, a telephone device, an IP telephone device, a computer and the like. A communication session arriving at one of contact centers 120 or 130 may enter PBX 155 through gateway 150 and may be delivered from PBX 155 to one of agent stations 157-159.

Although embodiments of the invention are not limited in this regard, a PBX may receive, handle and transmit any communication session or any data transferring between two or more parties such as, a telephone call, VoIP telephone call, an instant messaging session, chat, video conference or any other multi-media session, IP media or other multi-media session.

According to embodiments of the present invention, system 100 may enable active forwarding of a communication session handled by contact center 120 or 130 from SBC 112 to central recording system 115 located in data center 110. According to other embodiments of the invention, the central recording system may be located at a service provider's site that may transfer calls to more than one data center, as described with reference to FIG. 2.

Central recording system 115 also referred to herein as "central recorder" or "recorder" may be connected to, coupled to or embedded in SBC 112 and may capture and record any call or session passed through SBC 112 to contact center 120 or 130.

Although the present invention is not limited in this respect, packets related to a call may include the actual data, for example, audio data, and further may include information related to the actual data, also referred to herein as "media information". The actual data may be transferred using methods and session protocols for delivering or transferring the data packets, for example, by Real-time Transport Protocol (RTP) or any other protocol, also known as "the transport layer". The information related to the actual data, also referred to herein as "signaling" may be delivered using signaling methods and protocols, such as Session Initiation Protocol (SIP), H.323 or any other protocol, also known as "the application layer".

According to embodiments of the present invention, SBC 112 may transfer a session to contact centers 120 and/or 130 and may additionally act as a forwarding device by actively duplicating and forwarding the duplication of the sessions to central recorder 115 implementing any suitable forwarding protocol.

Although the present invention is not limited in this respect, the functions described herein as performed by SBC 112 may be performed by other telecommunication equipment such as a gateway, a switch or any other device.

Media information, for example, SIP or H.323 session messages, may flow between SBC 112 and gateway 150, which may also be a SBC. SBC 112 may deliver, actively forward or transfer media information related to the session, such as, for example, IP address and Port of the related RTP streams of the session. SBC 112 may transfer an identifier within the media information in order to allow identification of a call for recording purposes as described in detail below.

The media information and the actual data related to a session may be obtained by recording system 115 either by passively sniffing and decoding network traffic, for example, by a recording gateway, for example by VoIP Recording gateway (VRG) sold by Nice Ltd. of Ra'annana, Israel or any other suitable sniffing element. Alternatively, the media information and actual data may be actively duplicated and forwarded to recording system 115 by SBC 112, as described with reference to embodiments of the present invention.

According to embodiments of the present invention, central recorder 115 may receive Computer Telephony Integration (CTI) information related to sessions, such as telephone calls from contact centers 120 and 130, as indicated by lines 160 and 161 respectively. The CTI information may be transferred directly from PBX 155 or from a dedicated CTI server (not shown) coupled to PBX 155. The CTI information may be associated with the session, for example, a telephone call received by recorder 115 from SBC 112 and may enable selective recording of desired telephone calls based on the received CTI information and a set of rules.

The CTI information may be IP-based and may contain information related to the event flow of telephone calls handled by agents 157-159 of contact centers 120 and 130. Examples of events that may be reported by CTI information may include, but are not limited to, call set up, ringing, call establishment, call termination, transfer of a call, conference call, hold of a call and the like. CTI information may further include information related to the agent participating in the call, for example, one of agents 157-159. Examples of events related to the agent that may be reported as CTI information may include, but are not limited to, time that the agent logged in or logged out, agent availability, agent identification (ID). Other examples of CTI information may include, station ID, Phone Number (ANI), direction of a call, call identification (ID), DNIS (Dialed number identification service), trunk information and the like.

Although embodiments of the invention are described for ease of illustration with respect to telephone calls, it should be understood to a person skilled in the art that embodiments of the invention not limited in this regard and are likewise applicable to other communication sessions such as for example, an instant messaging session, chat, video conference or any other multi-media session, IP media or other multi-media session.

According to embodiments of the invention, central recorder 115 may receive media information, e.g., in a form of SIP/H.323 messages from SBC 112 and in addition may receive CTI call information from call centers 120 and 130. A specific call may be recorded by central recorder 115 based on pre-determined rules or set of rules related to the CTI information. For example, one of the rules may be recording calls handled by a certain agent. Accordingly, recorder 115 may correlate between the call information and media information, e.g., the call established by a certain agent (according to the CTI information) may be captured on certain IP address and port (according to the media information).

Recorder 115 may associate, correlate or link between CTI information and a telephone call based on identification information related to the call from both the CTI information and the media information. For example, the correlation may be performed based on equality of a call identifier. SBC 112 may add a unique identification to a call by attaching, for example, a unique identifier to the media information related to the call. For example, SBC 112 may add a call identifier to a SIP message related to the call. The call identifier may be inserted as a field in the header of the SIP message. The unique call identifier may be preserved by any communication equipment along the route of the call, for example, by any SBC, gateway, PBX, switch, router or other communication node. In addition, the same call identifier may be delivered by PBX 155 or a CTI server associated with PBX 155 as call-related data in the CTI information.

According to embodiments of the invention, SBC 112 may use allocate an IP address and Port for a specific telephone extension. When an agent using the specific telephone phone logs in, SBC 112 may deliver the unique identifier of that telephone extension (IP/Port) to the contact center. Then, on a per-call basis, the unique identifier may be retrieved and attached to the CTI information associated with the specific telephone call. Alternatively, SBC 112 may send the unique identifier per call.

Recorder 115 may receive from SBC 112, a plurality of data streams of telephone calls (or other communication sessions) and media information related to the calls including a call identifier that uniquely identifies each call. In addition, recorder 115 may receive, from data centers 120 and 130, CTI information related to telephone calls, including the call identifiers of each call. Recorder 115 may associate CTI information and media information having the same call identifier and may record the streams of data associated with calls having CTI information that matches pre-determined rules based.

Recorder 115 may record all the telephone calls handled by PBX 155 and then may perform correlation of the recorded sessions with CTI information associated with the recorded sessions after the recording process. This recording solution may be referred to as "total recording". Alternatively, recording system 115 may perform "selective recording" by recording calls that match a predetermined set of rules, usually related to the CTI information. In selective recording, the recording of the session is done after performing both operations of matching the CTI information to the set of rules and correlating between the CTI information and the information media.

Embodiments of the invention may enable tracing down a call from the moment it received by data center 110 and up to the moment it ends, e.g., C2G (cradle to grave) recordings. Furthermore embodiments of the invention may enable tracing down a call in a plurality of situations. For example, upon transferring of a call from one call center to another, e.g., from PBX 155 of call center 120 to PBX 155 call center 130, transferring a call between agents, a conference call, internal communication between agents and others based on the identification of the call carried by both media information and CTI information along the entire route of the call.

Embodiments of the present invention may include other architectures of telecommunication environments, for example, telecommunication environments having the recording system located at other central locations, such as within a provider's site, as described below with reference to FIG. 2.

Figure 2:
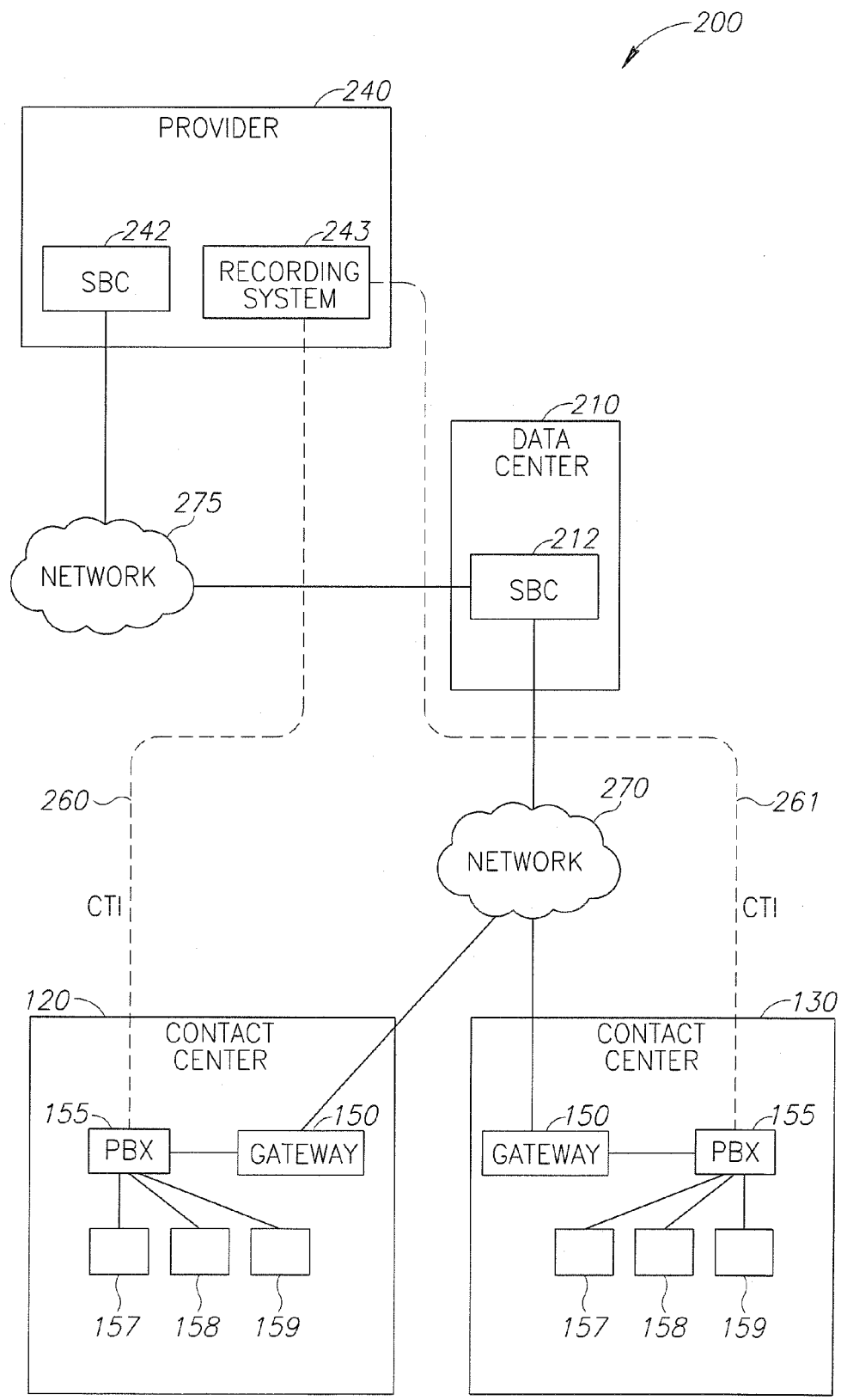
FIG. 2 is a high-level block diagram of another exemplary centralized recording system according to embodiments of the present invention.

Reference is now made to FIG. 2, which is a high-level block diagram of another exemplary centralized recording system according to embodiments of the present invention. Telecommunication environment 200 may include a service provider site 240 coupled, via a communication network, such as an IP network 275, to one or more data centers 210 (for simplicity, only one is shown). Telecommunication environment may further include contact centers 120 and 130, both configured to receive calls from data center 210 via a communication network, for example, an IP network, designated by 270.

Although in the exemplary illustration of FIG. 2, one provider's site, one data center and two contact centers are shown, it should be understood to a person skilled in art that the invention is not limited in this respect and according to embodiments of the present invention, telecommunication environment 200 may include any suitable numbers of data centers, provider sites, contact centers and any other type of branches, sites, locations and centers of a telecommunication environment.

According to some embodiments of the invention, communication sessions may be transferred by a session border controller (SBC) 242 located at provider's site 240 to a SBC 212 of data center 210 over network 275, which may be, for example, an IP public network. SBC 242 may duplicate and forward the communication session to a recorder 243, located in or coupled to provider site 240. The communication session may be also transferred or routed by SBC 212 to PBX 155 of one of contact centers 120 or 130 over network 270, which may be, for example, an IP private network.

Embodiments of the present invention, may enable recording a session arrived and handled in one of contact centers 120 and/or 130 by central recording system 243 located in or coupled to a site external to the contact centers handling the session, for example, in provider site 240 by forwarding of the session and media information related to the session from SBC 242 to recording system 243 and correlating media information with CTI information related to the session received from contact centers 120 or 130.

According to embodiments of the present invention, SBC 212 may transfer a call directly to contact centers 120 and/or 130 or may transfer the call to SBC 212 located in a different site such as data center 212. In addition SBC 242 may act as a forwarding device by actively duplicating and forwarding calls to central recorder 243 implementing any suitable forwarding protocol.

Media information, for example, SIP or H.323 session messages, may flow between SBC 212 and gateway 150 directly or via SBC 212. SBC 212 may deliver, actively forward or transfer media information related to the session, such as, for example, IP address and Port of the related RTP streams of the session.

As described in detail with reference to FIG. 1, Recorder 243 may receive a call, including media information related to the call, from SBC 242 and may also received CTI information from PBX 155 of contact centers 120 and 130 as indicated by lines 260 and 261, respectively. Recorder 115 may associate, correlate or link between CTI information received and a telephone call based on identification information within both the CTI information and the media information related to the call. For example, by attaching a unique call identifier inside a SIP message and in the CTI information as described above with reference to FIG. 1.

Although the scope of the present invention is not limited in this respect, the operations related to CTI information described as performed by PBX 155 may be performed by any CTI server which may be implemented using any suitable combination of software and/or hardware and may be implemented as a standalone unit or as a part of gateway 150 and/or PBX 155.

Although in the exemplary illustration of FIG. 1, recording system 115 is shown as located in data center 110 in the exemplary illustration of FIG. 2, recording system 243 is shown as located in provider site 240, it should be understood to a person skilled in art that the invention is not limited in this respect and according to embodiments of the present invention recording systems 115 and 243 may be coupled to data center 110 or provider site 240, located anywhere outside contact centers 120 and/or 130 or implemented as an integral, internal part of SBC 112 or 243.

Figure 3:
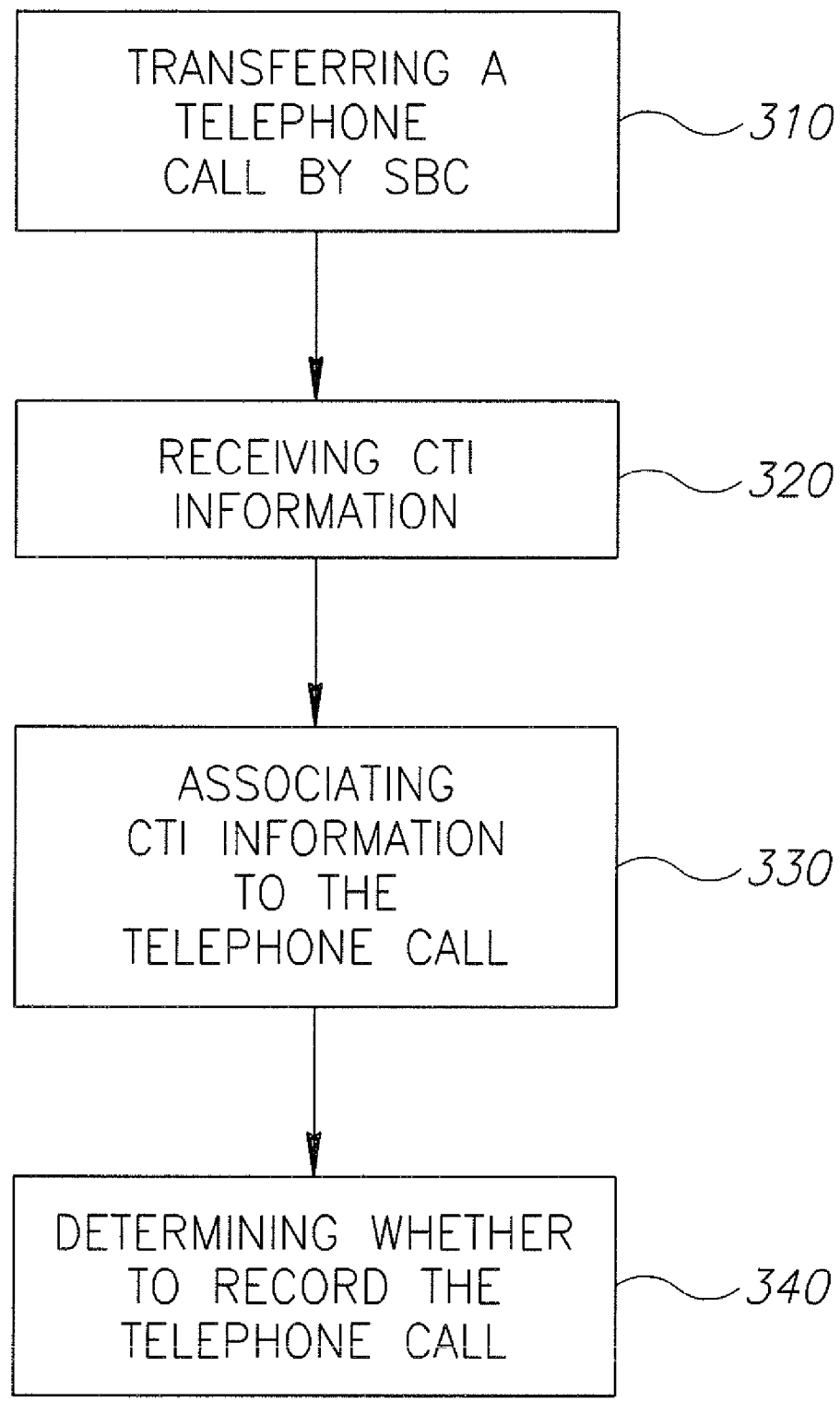
FIG. 3 is a flowchart of a method for centralized Internet Protocol (IP) recording according to embodiments of the present invention.

Reference is now made to FIG. 3, which is a flowchart of a method for centralized Internet Protocol (IP) recording in a branched communication environment according to embodiments of the present invention. Operations of the method may be implemented, for example, by any or all of the components environment 100 of FIG. 1 and/or environment 200 of FIG. 2, and/or by other suitable units, devices, and/or systems.

As indicated at box 310, the method may include transferring a telephone call by a SBC, for example, SBC 112 of FIG. 1, to a central recorder, for example, recorder 115 of FIG. 1 and to a contact center in which the telephone call may be handled, for example, one of contact centers 120 or 130 of FIG. 1. Transferring the telephone call by the SBC to the central recorder may include duplicating the telephone call or session by the SBC and forwarding the telephone call to the recorder. The telephone call being transferred and forward by the SBC may include both the actual data, for example, audio data and the media information related to the actual data. The SBC may transfer, attach or pass within the media information an identification of the call for future recording purposes.

As indicated at box 320, the method may include receiving by a central recorder, for example, by recorder 115 of FIG. 1, CTI information related to the telephone call from one or more contact centers, for example, from contact centers 120 or 130 of FIG. 1. The CTI information may contain the same an identification of the call as the called transferred to the contact center by the SBC.

As indicated at box 330, the method may include associating by the central recorder the CTI information to the telephone call, for example, by correlating the identification of the media information and the identification of the CTI information. The method may further include associating the CTI information to the media information related to the call.

As indicated at box 340, the method may include determining by the central recorder whether to record a call, based on, for example, a predetermined ruled or set of rules which may be related to the CTI information.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for central recording of telecommunication sessions comprising:

receiving by a central recording unit voice packets related to a call that are duplicated at a session border controller (SBC) and forwarded from the SBC to the central recording unit together with a call identifier that is attached to the call by the SBC;

receiving from a contact center by the central recording unit, computer telephony integration (CTI) information related to the call and the call identifier that has been transferred from the SBC to the contact center with the call;

associating between the CTI information received from the contact center and the call received from the SBC based on the call identifier; and determining by the central recording unit whether to record the call according to the CTI information and a set of rules.

2. The method of claim 1, comprising forwarding forwarding media information related to the call from the SBC to the central recording unit.

3. The method of claim 1, wherein the SBC transfers media information related to the call to a private branch exchange (PBX) within the contact center.

4. The method of claim 1, wherein the call is transferred from the SBC to the contact center over Internet Protocol (IP) communication network.

5. The method of claim 1, comprising associating CTI information related to the call received from the contact center with media information related to the call received from the SBC.

6. The method of claim 2, wherein forwarding media information related to the call comprises forwarding the media information in a form of Session Initiation Protocol (SIP) messages.

7. A system for central recording of telecommunication sessions comprising:

a central recording unit; and a session border controller (SBC) to duplicate voice packets related to a call, to attach a call identifier to the call, to forward duplicated voice packets related to the call together with the call identifier to the central recording unit and to transfer the call together with the call identifier to a contact center, wherein the central recording unit is to receive computer telephony integration (CTI) information related to the call from the contact center together with the call identifier that has been transferred from the SBC, to associate the CTI information received the call center to the call received from the SBC based on the call identifier and to determine whether to record the call according to the CTI information and a set of rules.

8. The system of claim 7, wherein the central recording unit is located externally to the contact center.

9. The system of claim 7, wherein the call comprises media information related to IP address and port.

10. The method of claim 1, wherein the SBC and the contact center are connected by an Internet Protocol (IP) communication network.

* * * * *